Patented June 16, 1925.

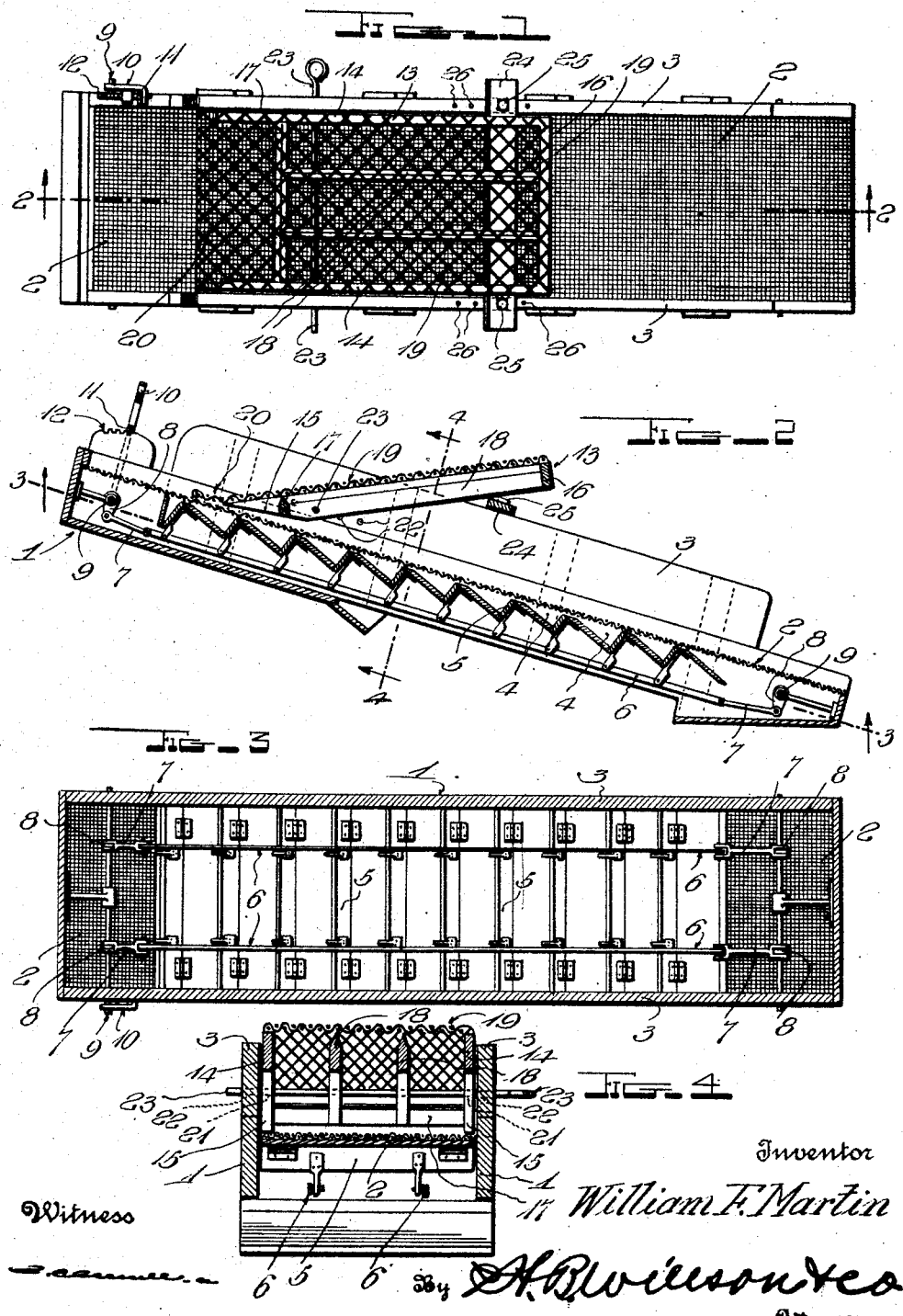

1,542,627

UNITED STATES PATENT OFFICE.

WILLIAM F. MARTIN, OF HARRISBURG, PENNSYLVANIA.

COAL WASHER AND SEPARATOR.

Application filed January 19, 1925. Serial No. 3,461.

*To all whom it may concern:*

Be it known that I, WILLIAM F. MARTIN, a citizen of the United States, residing at Harrisburg, in the county of Dauphin and State of Pennsylvania, have invented certain new and useful Improvements in Coal Washers and Separators; and I do declare the following to be a full, clear, and exact description of the invention, such as will enable others skilled in the art to which it appertains to make and use the same.

This invention may be considered as an improvement upon the construction shown by my U. S. Patent 1,412,291, of April 11, 1922, as well as an advance over analogous screens for coal and other materials.

It is one object of the invention to provide a relatively coarse screen above a portion of the ordinary comparatively fine screen, to prevent the discharge of excessively large pieces of material onto the last named screen, so that it cannot be injured and worn out in such a short length of time as now usually occurs, and in carrying out this end, a further aim of the invention, is to provide a simple and inexpensive construction which permits quick and easy adjustment of the auxiliary screen to the most advantageous position according to the nature of the material being screened.

With the foregoing in view, the invention resides in the novel subject matter hereinafter described and claimed, the description being supplemented by the accompanying drawing.

Figure 1 is a top plan view.

Figure 2 is a longitudinal sectional view on line 2—2 of Fig. 1.

Figure 3 is substantially a horizontal sectional view on line 3—3 of Fig. 2.

Figure 4 is a vertical transverse sectional view on line 4—4 of Fig. 2.

In the drawing above briefly described, the numeral 1 designates an elongated, inclined frame in which a main screen 2 is mounted, said frame having side walls 3 which extend longitudinally and project above the screen. Below the screen, transverse pockets 4 are provided to receive the material passing through said screen, said pockets having hinged side walls 5 connected by a pair of longitudinal rods 6 so that they may be opened at will to discharge the contents of the pockets. The rods 6 have been shown connected by links 7 with crank arms 8 on transverse rock shafts 9 which may be mounted and controlled in any desired manner. Upon one of these shafts, a lever 10 has been illustrated, which lever may be held in adjusted position by a dog 11 engaging an appropriate rack 12.

The construction so far briefly described, is a substantial duplicate of that shown in the patent above referred to, the principal distinction being that the side walls 3 extend to quite an extent above the screen 2.

Disposed over the upper portion of the screen 2, is a second and relatively small frame 13 which inclines in a direction opposite to the inclination of the frame 1, at least the lower portion of said frame 13 being received between the side walls 3. This frame 13 comprises a pair of inclined side bars 14 having beveled lower ends 15, said side bars being connected at their upper ends by a transverse bar 16 and being similarly connected near their lower ends by a transverse bar 17. A pair of longitudinal screen-supporting bars 18 extend between the bars 16 and 17 and are secured thereto, and the upper edges of said bars 17 and 18 are preferably of V-shape in order to prevent any material from lodging thereon, when such material passes through a comparatively coarse screen 19 which is secured to the frame 13 and is supported against sagging by the numerous bars thereof. This screen is provided with a flexible lower end 20 which projects beyond the lower end of the frame 13 and lies upon the screen 2, regardless of the position to which the aforesaid frame and the screen 19, may be adjusted. In order to effect adjustment of this frame and the screen carried thereby, I prefer to employ the construction described below, or a substantial equivalent thereof.

The side bars 14 and the screen-supporting bars 18 are formed with transversely alined openings 21, and the side walls 3 are formed with longitudinally spaced openings 22, and a rod 23 is insertible through any of the openings 22 and through the openings 21, to support the lower end of the frame 13 and to constitute a pivot about which this frame may be tilted. It will be seen that the longitudinally spaced openings 22 in the side walls 3, permit longitudinal adjustment of the screen frame 13 with respect to the screen 1, to any desired extent. Vertical tilting of this frame to different inclination, is also permitted.

To support the upper end of the frame

13, I have provided a transverse bar 24 upon which said upper end of the frame rests, the ends of said bar 24 resting upon the upper edges of the side walls 3. Normally, the bar 24 is secured to the walls 3 by lag screws, nails or the like 25, but when these securing elements are released, said bar 24 may be slid longitudinally of the walls 3, so that the frame 13 and its screen 19 may be supported at any desired inclination. At 26, spaced openings have been shown in the upper edges of the walls 3, for the purpose of receiving the lag screws or the like 25, when the bar 24 is moved to its different positions.

By providing the novel construction shown and described, or an analogous arrangement, an improved screening device is provided, in which the auxiliary screen will catch excessively large pieces of coal or other material being screened, and will not permit them to fall upon and injure the main screen 2. The smaller particles however, to be screened by said screen 2, pass freely through the screen 19, as will be readily understood, and from time to time, the accumulation of large bodies upon the heavy screen 19 may be removed in any way. Whenever advisable, the entire frame 13 and the screen 19 carried thereby, may be longitudinally adjusted with respect to the frame 1, and may be tilted to any desired inclination, so that the best results may be obtained, according to the character of the material being screened.

I claim:

1. A device of the class described comprising an inclined frame having parallel side walls, an inclined screen substantially co-extensive with said frame and secured thereto below the upper edges of said side walls, a second relatively small frame over said screen inclined in the opposite direction and having at least its lower portion received between said side walls, said walls and the side members of said second frame having transversely alined openings, a rod passing through said openings and constituting a pivot about which the second frame may be tilted, a cross bar upon which the upper end of said second frame rests, the ends of said cross bar resting upon the upper edges of the aforesaid side walls and being adapted to be slid longitudinally thereof to support the second frame at different inclinations, means for normally securing said cross bar against sliding on said side walls, and a relatively coarse screen secured to said second frame and having a flexible lower end extending beyond the same onto the first named screen.

2. A structure as specified in claim 1; said side walls having additional transverse openings to receive said rod and permit adjustment of the second frame longitudinally of the first named screen.

3. A device of the class described comprising a main inclined screen, a frame over said screen inclined in the opposite direction, means pivotally mounting the lower end of said frame and permitting swinging thereof to different inclinations, means for supporting said frame at different inclined positions, and a relatively coarse screen secured to said frame and having a flexible lower end projecting beyond the same and lying on the first named screen.

In testimony whereof I have hereunto affixed my signature.

WILLIAM F. MARTIN.